(12) United States Patent
Halford

(10) Patent No.: US 7,703,190 B2
(45) Date of Patent: Apr. 27, 2010

(54) TOOLING SYSTEM AND METHOD

(75) Inventor: Ben John Halford, Rutland (GB)

(73) Assignee: Surface Generation Limited, Peterborough (GB)

( * ) Notice: Subject to any disclaimer, the term of this patent is extended or adjusted under 35 U.S.C. 154(b) by 1065 days.

(21) Appl. No.: 10/467,934

(22) PCT Filed: Feb. 13, 2002

(86) PCT No.: PCT/GB02/00621

§ 371 (c)(1),
(2), (4) Date: Feb. 10, 2004

(87) PCT Pub. No.: WO02/064308

PCT Pub. Date: Aug. 22, 2002

(65) Prior Publication Data

US 2004/0145105 A1    Jul. 29, 2004

(30) Foreign Application Priority Data

Feb. 14, 2001  (GB) ................................. 0103555.9
Feb. 14, 2001  (GB) ................................. 0103556.7

(51) Int. Cl.
B23P 13/04    (2006.01)
B25B 5/16     (2006.01)

(52) U.S. Cl. ........................................ 29/557; 269/266

(58) Field of Classification Search .................. 29/557, 29/558, 559, 521, 700, 743, 759, 281.1; 269/266, 269/21; 72/413, 414, 20.1, 33; 33/561.1
See application file for complete search history.

(56) References Cited

U.S. PATENT DOCUMENTS 3,442,044 A * 5/1969 Quercetti ..................... 446/124
3,722,257 A * 3/1973 Bogart et al. ................. 72/475
4,684,113 A   8/1987 Douglas
5,168,635 A * 12/1992 Hoffman ..................... 33/561.1
5,364,083 A * 11/1994 Ross et al. ..................... 269/21
5,546,784 A * 8/1996 Haas et al. ..................... 72/413
6,015,214 A * 1/2000 Heenan et al. ............... 359/529
6,578,399 B1 * 6/2003 Haas et al. ..................... 72/57

FOREIGN PATENT DOCUMENTS

| DE | 3217866  | 11/1983 |
| DE | 29513348 | 10/1995 |
| GB | 868162   | 5/1961  |

* cited by examiner

*Primary Examiner*—John C Hong
(74) *Attorney, Agent, or Firm*—Harness, Dickey & Pierce, P.L.C.

(57) ABSTRACT

A tooling system includes a plurality of elements arranged in an array, each element being moveable longitudinally relative to the other elements in the array and having a first end. The system further includes a device, adapted to adjust the relative longitudinal positions of the elements such that the free ends of the elements define approximately a desired surface contour and a device for retaining the elements in their adjusted positions. The first end of each element may be provided on a machinable portion removably mounted to a base portion, the arrangement being such that the free ends of the elements can be machined to produce the desired surface contour. The tooling system may include a plurality of elements arranged in an array, the elements of the array being movable between a closed position in which the elements contact one another and are secured in position, and an open position in which the elements of the array are spaced apart and are capable of vertical movement relative to one another, wherein it also includes a drive device for opening and closing the array.

30 Claims, 5 Drawing Sheets

TOOLING SYSTEM AND METHOD

This application is the national phase under 35 U.S.C. §371 of PCT International Application No. PCT/GB02/00621 which has an International filing date of Feb. 13, 2002, which designated the United States of America and which claims priority on Great Britain Patent Application number GB 0103555.9 filed Feb. 14, 2001 and GB 0103556.7 filed Feb. 14, 2001, the entire contents of which are hereby incorporated herein by reference.

FIELD OF THE INVENTION

The present invention generally relates to a tool, and more particularly to a reconfigurable modular tool.

BACKGROUND OF THE INVENTION

The manufacture of a tool, or pattern, has conventionally involved machining from a billet of material, an additive process such as casting from a mould, sculpting or fettling, or fabrication, for example from sheet metal. For large scale tools, typically required in the aerospace and automotive industries, the length of time in preparing tools by such methods is slow, and is prohibitively expensive. This is due in part to the large size of the billets of material required, which must be committed to the tools in their manufacture, and which may have to be ordered months in advance of their supply.

Furthermore, the amount of skilled labor time and material required in producing a tool conventionally has made it uneconomical to produce a tool for limited volume production, for example in product development, limited batch production and mass customization.

In order to overcome these problems, reconfigurable modular tools have been developed, typified by that disclosed in U.S. Pat. No. 5,846,464. In the tool disclosed in this patent, an array of vertically adjustable pins are mounted on a drive base, such that the height of each pin above the base can be individually set. A flexible surface, or face sheet, is attached to flexible supports, which are mounted at the ends of the pins. The surface contour of the face sheet can therefore be set to a desired contour by adjusting the individual heights of the pins. The adjustments are controlled automatically through a computer, which is pre-programmed with the desired contour. When the tool is in use, the face sheet surface acts either as a primary tooling surface, or as a secondary tooling surface for producing a pattern or mould, for example, for casting.

Reconfigurable tools of the kind described are suitable for some applications, but for other applications do not have sufficient robustness and/or definition in the tooling surface. The pins which support the flexible face sheet are spaced apart, and do not lie in the plane of the desired surface contour. Therefore the face sheet surface is only a point to point approximation of the desired surface contour. The resolution of the surface is dependent on the density, number and size of pins in the tool array, but as the density of the pins increases, and their size reduces, it becomes increasingly difficult to adjust the positions of the pins.

The combined strength of the pins is also much less than the strength of a solid tool, and therefore the tool is not strong enough for the majority of tooling operations. Furthermore, the aspect ratio, that is, the range of depth in the tooling surface in comparison to its width, is limited by the amount the face sheet can deform.

It has also been proposed in GB patent No. 868,162 to provide a device for supporting workpieces during machining, including a holder in the form of a housing frame or body having an array of vertically adjustable plungers mounted therein, together with thrust-transmitting, vertically-disposed packing pieces between these plungers, and a device for exerting pressure laterally to the plungers through the packing pieces to clamp them in adjusted position.

SUMMARY OF THE INVENTION

According to an embodiment of the present invention there is provided a tooling system including a plurality of elements arranged in an array, each element being moveable longitudinally relative to the other elements in the array and having a first end. The system further includes a device adapted to adjust the relative longitudinal positions of the elements such that the free ends of the elements define approximately a desired surface contour and a device for retaining the elements in their adjusted positions. Further, the first end of each element is provided on a machinable portion removably mounted to a base portion, the arrangement being such that the free ends of the elements can be machined to produce the desired surface contour.

The term base portion as used herein includes both a base portion which is a part of the element and is driveable by a drive member and a drive member per se.

It is preferable that the elements of the array are movable between a closed position in which the elements contact one another and are secured in position, and an open position in which the elements of the array are spaced apart. A drive device is preferably provided for opening and closing the array.

According to a further aspect of an embodiment of the present invention there is provided a tool including a plurality of elements arranged in an array. The elements of the array are movable between a closed position in which the elements contact one another and are secured in position, and an open position in which the elements of the array are spaced apart and are capable of vertical movement relative to one another, and a drive device for opening and closing the array.

In this further aspect of an embodiment of the invention, the elements may be machinable to an exact surface contour, for example by milling, routing or laser ablation. Consequently, the elements may be reused a number of times, the elements being machined with a new surface contour as desired for a particular tool. The whole length of the elements may be machinable and removable, or the elements may be constructed from an upper portion, and a lower portion, the upper portion being removable and machinable.

It is a further advantage of an embodiment of the invention that when the face of the tool is machined, the tool face is not a point to point approximation of the desired surface contour, but is exact. Furthermore, machining of the elements enables larger elements to be utilized for a given size of tool which are more easily vertically positioned, laterally moved and secured within the array. It is a further advantage of the invention that the number of pins can also be reduced.

Preferably a drive device or further drive device provides vertical drive to each of the elements. The further drive device may include a separate drive device for each element, a moveable drive device which drives each of the elements in turn, or a set of drive device, each driving one or more elements.

Alternatively, the elements may be set in a raised position and each element allowed to fall under gravity to a desired position, where the element is braked and secured.

Preferably the elements of the array tessellate to produce a continuous tooling surface. In a further alternative arrangement, the elements may not fully tessellate, but may be arranged with ducts between them for the application of a negative pressure to the tool surface for use of the tool in vacuum forming, and the application of a positive pressure to the tool surface for cooling the tool and/or for ejecting a product from the tool surface. Otherwise, the elements may be provided with through holes or channels on their surface for the application of a negative or positive pressure to the tool surface.

It is preferable that the cross-section of each element is substantially square with a pointed tip formed at a first apex of the square and a correspondingly shaped recess formed at the opposite vertex of the square. Alternatively, the cross-section of the elements may be square, rectangular or of any tessellating cross section.

The elements may be all of the same size. Alternatively, the elements may be of different sizes depending on the changing contour of the tooling surface, for example, a greater element density of smaller elements is preferable in an array having large changes in surface contour in order to reduce the machining required of the elements.

The elements of an array may also be of varying size depending on the product being produced by the tool, for example, in high detail areas of a product, a greater element density of smaller elements is required in the array.

The elements can be made from a wide range of materials, for example plastics, ceramics, metals, wood, composites and alloys, and the choice of material depends on the environment of application of the tool. The elements within an array may be made from the same or different materials. The choice of material can be limited by the requirement, if any, that the tooling surface be machined.

The array may include special elements known per se which special elements have a particular functionality in the array. Such special elements may include ejector pins, side action pins for producing an undercut and sprue pins, for the introduction of material into the mould.

Where it is desirable or required that the surface of the part to be produced in the tooling system of the invention has a surface free of witness marks, caused by the presence of gaps between the elements, the elements may be bonded together at the tooling surface. Depending on the material from which the elements are made, they may be bonded by any suitable technique, for example by resin bonding or by welding. When it is required to reconfigure the tool, the bonding may be removed, for example either mechanically by machining or chemically. The surface free of witness marks may be required for example for cosmetic or aesthetic reasons or to ensure structural integrity.

In use, a coolant or heating medium may be applied to the rear face of the tooling system according to the various aspects of embodiments of the present invention.

According to a further aspect of an embodiment of the present invention there is provided a method of tooling including mounting a plurality of elements in an array, each element having an upper portion removably mounted on a base portion, moving the elements vertically relative to one another and machining the upper portions to a desired surface contour.

Where it is required that the tooling system according to an embodiment of the invention has large changes in surface contour, the elements within a tooling system may be arranged in a series of modules which may be arranged in the same plane or in a multi-level arrangement. In this way, the lengths of the elements and actuators can be reduced without affecting the tool aspect ratios which can be attained.

According to a further aspect of an embodiment of the present invention there is provided a method of tooling surface generation using a modular tool in which a plurality of elements are arranged in an array, including the steps of;

moving the elements from a closed position, in which the elements contact one another, to an open position in which the elements of the array are spaced apart; moving the elements vertically relative to one another to create a desired surface contour of the tool, and moving the elements back from the open position to the closed position.

Preferably the elements of the array are machined when the array is in the closed position, although the elements may be machined when the array is in the open position.

Alternatively, upper parts of the elements of the array may be removed and machined independently of the array.

BRIEF DESCRIPTION OF THE DRAWINGS

The invention will now be described by way of example only with reference to the accompanying drawings in which.

DETAILED DESCRIPTION OF THE PREFERRED EMBODIMENTS

Figure 1:
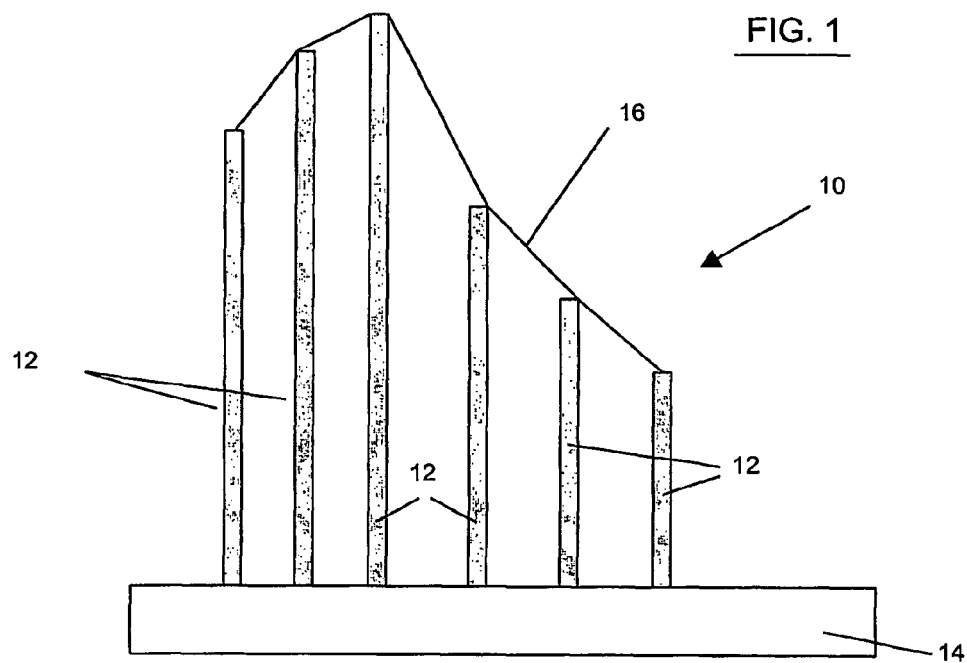
FIG. 1 shows a known arrangement of a reconfigurable modular tool in which a flexible face sheet is mounted on an array of vertically adjustable pins.

Referring firstly to FIG. 1, a known reconfigurable modular tool is indicated generally at 10. A plurality of spaced apart vertically adjustable pins 12 are mounted on a drive base 14, such that the height of each pin 12 above the drive base 14 can be individually set. A flexible face sheet 16 is attached to the ends of the pins 12. A desired surface contour of the face sheet 16 can be set by adjusting the individual heights of the pins 12. The adjustments are controlled automatically through a computer (not shown), which is pre-programmed with the desired contour.

A first embodiment of a tool in accordance with the invention will now be described with reference to FIGS. 2 to 5. The tool is indicated generally at 15 and includes a plurality of elements 18 arranged in a closed position, that is, with the sides of adjacent elements 18 in contact with one another. An upper end 20 of each element 18 forms part of a tooling surface 22. As shown in FIG. 5, the tool 15 includes nine elements 18 which are arranged in an array 28.

Clamping members 24,26 provide additional lateral support and secure the elements 18 of the array 28 relative to one another, when the tool 15 is being machined and is in use.

Figure 3:
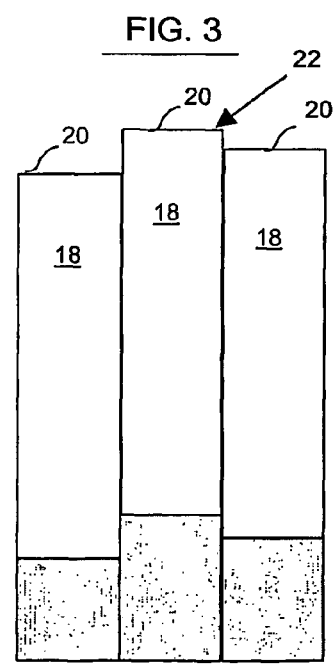
FIG. 3 shows the tool of FIG. 2 in which the elements have been moved vertically moved relative to one another.

In order to change the surface contour 22 of the tool 15, the clamping members 24,26 are released, and the elements 18 moved vertically relative to one another by a drive device in order to produce an approximation of the desired tool surface contour 22, as shown in FIG. 3. The drive device is optionally removable.

In the preferred arrangement (not shown), the drive device includes a downwardly extending threaded rod rotatably mounted to the underside of each element, and threadingly engaged in a base portion. The elements 18 are positioned by rotation of the threaded rods, each of which is driven by an electric motor. In an alternative arrangement (not shown), all of the elements 18 are lifted manually and each element is allowed to fall under gravity to a desired position, where the element is secured.

Figure 4:
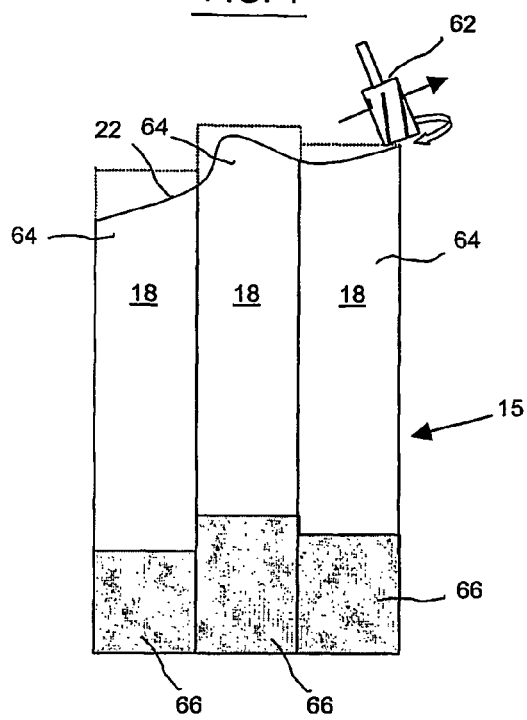
FIG. 4 shows the tool of FIGS. 2 and 3 in which the surface contour of the tool is being cut to a desired shape with a milling cutter.
Figure 5:
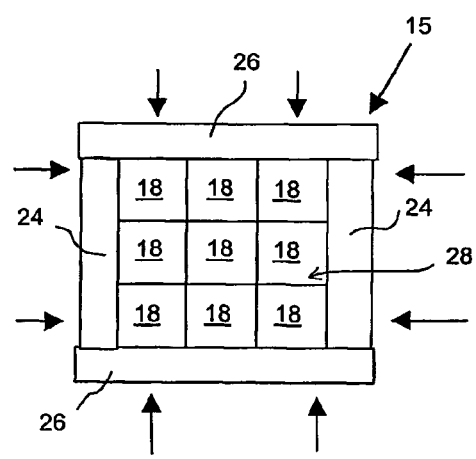
FIG. 5 shows a clamp frame for locking the elements in the closed position.

When the elements have been positioned vertically, the tooling surface 22 is machined by a milling cutter 62, as seen in FIG. 4. A minimum amount of machining is required, because the elements 18 have already been positioned before machining, as described above. Only a finishing cut should be required. Thus, typically, less than 5% of each element is sacrificed in machining.

The elements 18 are formed in two parts, a removable and machinable upper part 64, and a lower part 66 which is a permanent part of the tool and is capable of being driven as described. When the tooling surface 22 is machined, it is preferred that the upper parts 64 of the elements 18 are machined in the assembled tool 15. However, if this is not possible due to the large size of the tool 15, then the upper parts 64 can be removed from the tool 15 and machined independently.

Figure 2:
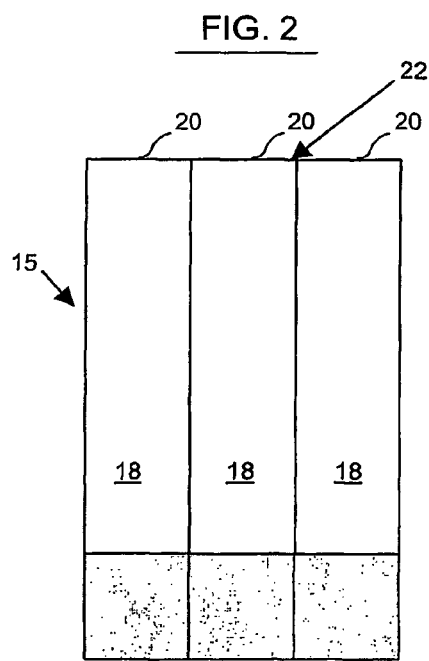
FIG. 2 shows a tool according to an embodiment of the invention including a plurality of elements in an array.
Figure 6:
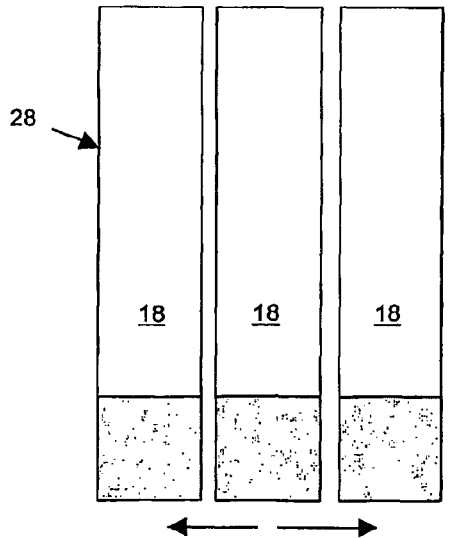
FIG. 6 shows an alternative embodiment of the invention in which the elements of the array are moved to an open position before vertical movement of the elements.
Figure 7:
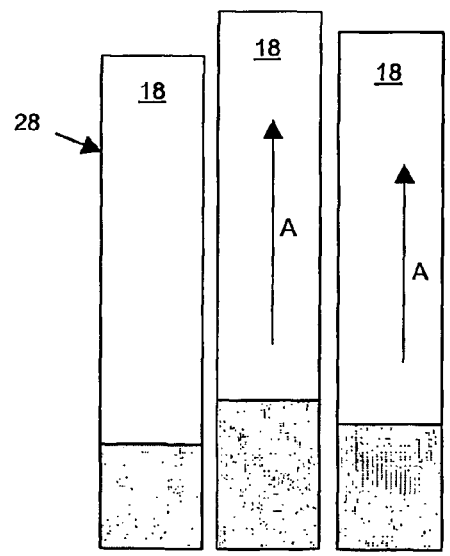
FIG. 7 shows the tool of FIG. 6 in which the elements are being moved vertically in the open position.

In an alternative embodiment of the invention, shown in FIGS. 6 and 7, the elements 18 of the array 28 are moved from the position shown in FIG. 2, that is a closed position, to an open position, shown in FIG. 6. The elements 18 are driven apart by way of an electric motor, gearing and cross slides (not shown). When the array 28 is in the open position, the elements 18 are moved vertically relative to one another, as indicated in FIG. 7 by arrows A.

Once the elements 18 have been positioned vertically, the array 28 is moved back from the open position to the closed position. Finally the elements 18 of the array 28 are secured by the clamping members 24,26, see FIG. 5, and the tooling surface 22 is machined ready for use.

Figure 8:
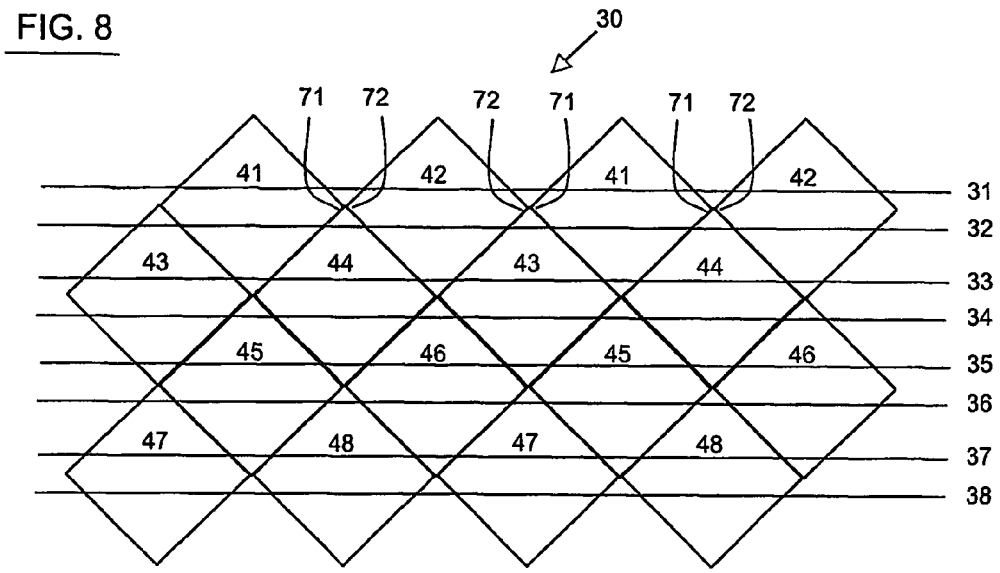
FIG. 8 shows a plurality of square elements mounted in an alternative array on supporting rails in the closed position.
Figure 9:
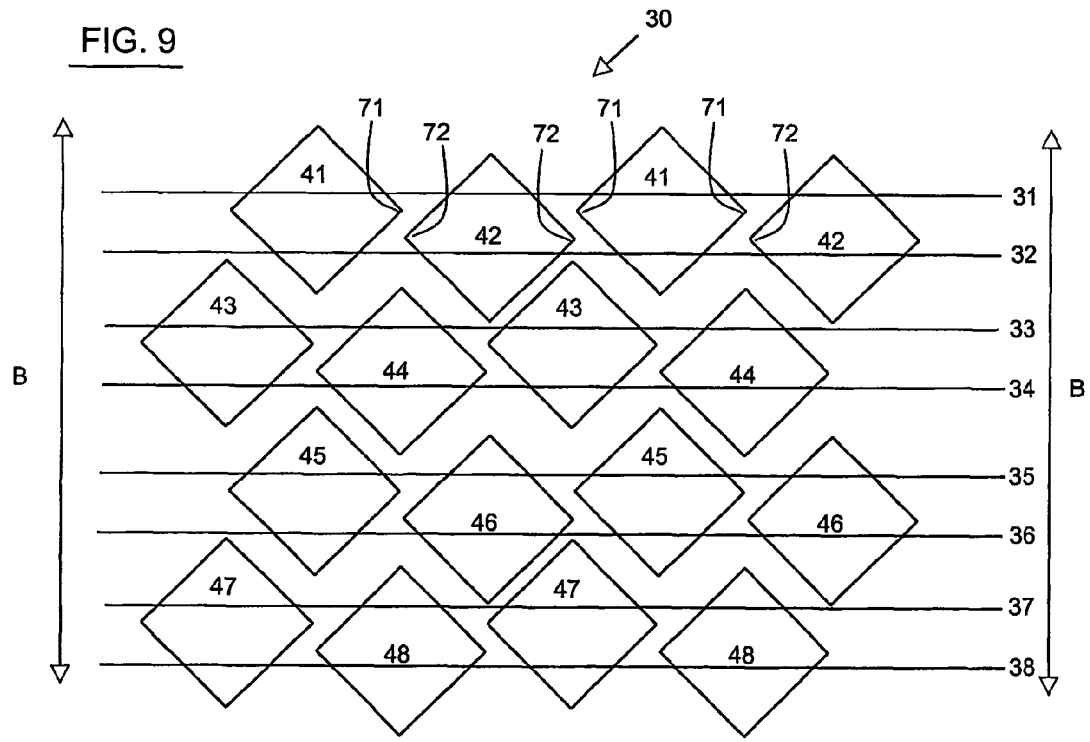
FIG. 9 shows the elements of the array of FIG. 8 moved to the open position.

An alternative array 30 is shown in FIGS. 8 and 9 in the closed and open positions respectively. Supporting rails 31 to 38 support respective elements 41 to 48, and are driven apart in order to move the elements of the array 30 between the closed and open positions as indicated by arrows B.

The vertices of adjacent elements, for example elements 41 and 42, having diagonals which are aligned in the closed position, touch one another. In order to separate the vertices 71,72 of the adjacent elements 41,42, the elements 41,42 are mounted on separate supporting rails 31,32. Similarly adjacent elements 43,44; 45,46 and 47,48 are mounted on separate supporting rails.

Figure 10:
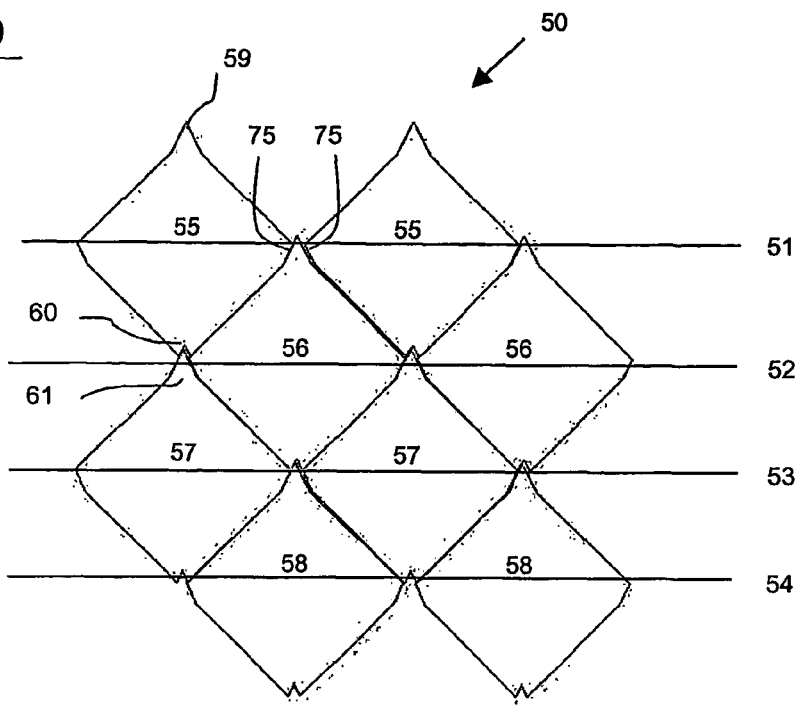
FIG. 10 shows a plurality of self guiding elements mounted in an array on supporting rails in the closed position.
Figure 11:
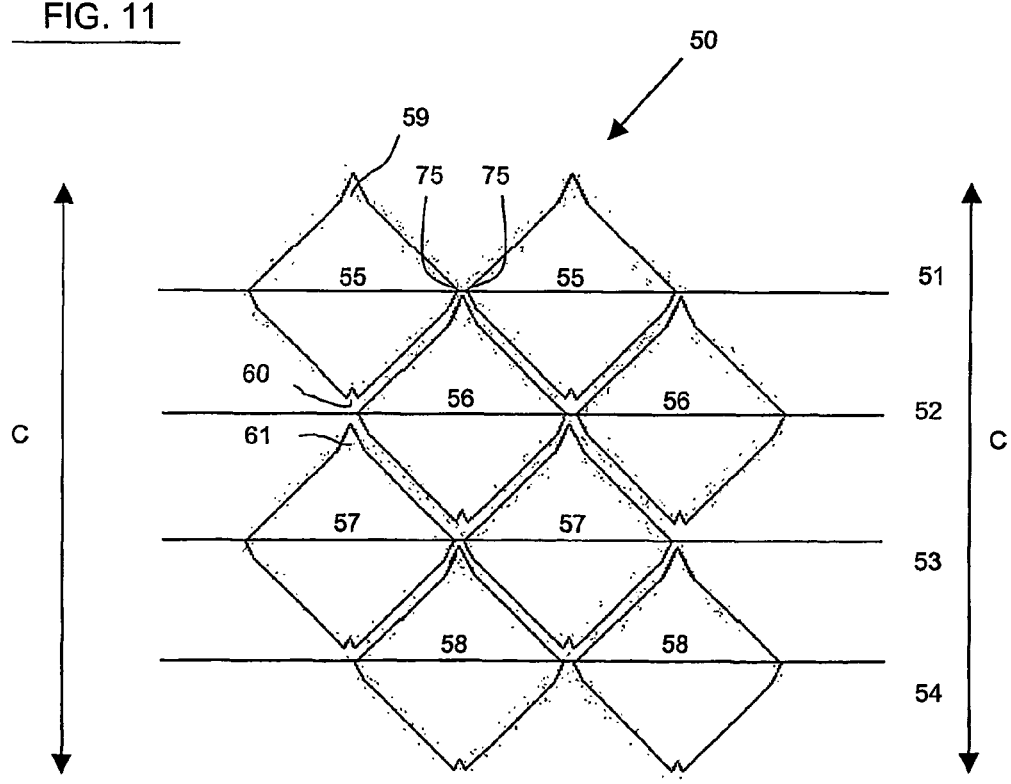
FIG. 11 shows the elements of the array of FIG. 10 moved to the open position.

FIGS. 10 and 11 show a further array 50 in the closed and open positions respectively. Supporting rails 51 to 54 support respective elements 55 to 58, and are driven apart in order to move the elements of the array 50 between the closed and open positions as indicated by arrows C. In the array 50, the elements 55 to 58 are not square in cross section, but are substantially square and are formed with a pointed tip and correspondingly shaped recess, indicated respectively at 59 and 60 on one of the elements 55.

The pointed tip 59 and recess 60 are positioned in axial alignment at opposite vertices of each element 55,56,57,58, and are co-axial with the direction of opening and closing movement of the array 50.

Consequently, when the array 50 is in the closed position, the tips 59 engage in respective recesses 60 of adjacent elements, for example, the tip 61 of element 57 locates in the recess 60 of element 55.

This arrangement has the advantage that the vertices 75 of the adjacent elements 55 do not touch one another in the closed position. Consequently only one supporting rail 51 is required to support the adjacent elements 55 in the movement from the closed to the open position of the array 50. Similarly the other adjacent elements 56,57,58 only require one respective supporting rail 52,53,54 for each row of adjacent elements. Furthermore, the interlocking nature of the tips and recesses adds strength to the tool 15, and assists in guiding the elements of the array 50 in the movement from the open to the closed position.

Figure 12:
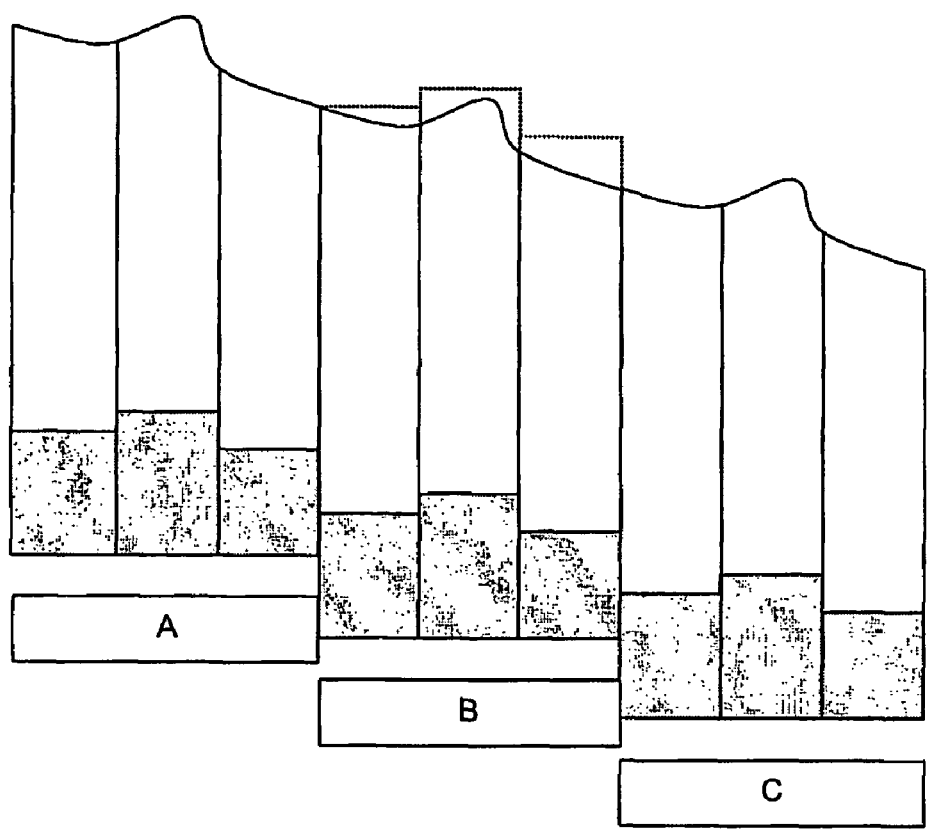
FIG. 12 shows an alternative embodiment of the invention in which the elements of the array are arranged in modules.

A further alternative arrangement is shown in FIG. 12 in which the elements of the array are arranged in modules identified as A, B and C. The modules A, B and C may be arranged in the same plane or may be stacked in a multi-plane arrangement as shown in FIG. 12.

Although the elements 18 shown in the Figures are all of the same size, different sizes of element 18 can be used in different tooling applications. For example, in areas of the tooling surface 22 where large aspect ratios are required, that is, the range of depth in the tooling surface contour is large in comparison to its width, then by using a larger number of smaller elements 18, less machining is required of each of the elements.

For tools 15 which are to be used in vacuum forming, through holes (not shown) are provided in the elements 18 between the tooling surface 22 and the underside of the elements, which are connected to a vacuum pump. Alternatively, the elements may be formed in a cross section which does not tessellate completely. When arranged in a closed array, these elements (not shown) have ducts between them, which extend to the tooling surface, and which can be used for the application of a vacuum. A positive pressure can also be applied to the tooling surface 22 through the holes or ducts for cooling of the tool, or removal of a product from the tooling surface 22.

The elements 18 can be made from a wide range of materials, for example plastics, metals, wood and alloys, and the choice of material depends on the environment of application of the tool. However, the choice of material is limited by the requirement that the tooling surface 22 be machined. In some applications the tooling surface can be protected, for example, by the application of a resin, membrane, or plated veneer over the tooling surface 22.

It is intended that the size of each tool 15 is unlimited, and that the size of the tool 15 can be changed by adding or removing elements 18 from the array 28. For a large product, such as an aircraft wing, the elements may for example be 500 mm square with a vertical movement of 1 m. For a small product, such as a mobile telephone, the elements may for example be 5 mm square with a vertical movement of 300 mm. The tool 15 is intended for use in a range of applications, both primary and secondary, including for example vacuum forming, composite lay ups, press tooling, injection molding and die casting.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A tooling system for approximating a desired tooling surface, comprising:
   a plurality of elements arranged in an array, each element being moveable longitudinally relative to the other elements in the array and having a first end;
   adjustment means for individually adjusting the positions of the elements in a longitudinal direction in order to achieve predetermined relative positions of the elements;
   means for retaining the elements in their adjusted positions, wherein the first end of each element is provided on a machinable portion removably mounted on a base portion, the free ends of the elements designed to be machined to produce the desired tooling surface contour; and
   a plurality of moveable rails, each rail having a plurality of said elements mounted thereon in a single line, the rails being movable relative to one another in a direction substantially perpendicular to the longitudinal direction of the elements so as to allow the elements of the array to be moved from a closed position in which the elements on one of said movable rails contacts the elements on an adjacent movable rail, to an open position in which elements on at least two adjacent rows of the array are spaced apart such that individual elements can be moved relative to one another.

2. A tooling system as claimed in claim 1, further comprising:
   brake means for arresting vertical movement of each of the elements.

3. A tooling system as claimed in claim 2, wherein the elements of the array tessellate to produce a continuous tooling surface.

4. A tooling system as claimed in claim 2, further comprising:
   drive means for vertically driving each of the elements.

5. A tooling system as claimed in claim 1, further comprising:
   drive means for providing vertical drive to each of the elements.

6. A tooling system as claimed in claim 5, wherein the elements of the array tessellate to produce a continuous tooling surface.

7. A tooling system as claimed in claim 1, wherein the elements of the array tessellate, with the rails in the elements in the closed position, to produce a continuous tooling surface.

8. A tooling system as claimed in claim 7, wherein the elements are provided with through holes for the application of at least one of a positive and negative pressure to the tooling surface.

9. A tooling system as claimed in claim 8, wherein the cross-section of each element is substantially square with a pointed tip formed at a first apex of the square and a correspondingly shaped recess formed at the opposite vertex of the square.

10. A tooling system as claimed in claim 7, wherein a cross-section of each element is substantially square with a pointed tip formed at a first apex of the square and a correspondingly shaped recess formed at the opposite vertex of the square.

11. A tooling system as claimed in claim 1, wherein the elements are of different sizes.

12. The tooling system of claim 1, further comprising:
   drive means for opening and closing the array.

13. A tooling system as claimed in claim 12, wherein the elements within the array are arranged in modules, which modules may be arranged in the same plane is stacked in a multi-plane arrangement.

14. A tooling system as claimed in claim 1, wherein the elements are removable.

15. A tooling system as claimed in claim 1, wherein the elements are constructed from an upper portion, and a lower portion, the upper portion being removable and machinable.

16. A tooling system as claimed in claim 1, wherein the elements are bonded together at the tooling surface.

17. A tooling system as claimed in claim 1, wherein the elements within the array are arranged in modules, which modules may be arranged in the same plane is stacked in a multi-plane arrangement.

18. A tooling system as claimed in claim 1, wherein individual elements are adjustable within the array and/or removable therefrom when the elements are in the open position.

19. A tooling system as claimed in claim 1, wherein individual elements are removable and replaceable within the array.

20. A tooling system as claimed in claim 1, wherein the array is a two-dimensional array.

21. A tooling system according to claim 1, wherein the elements are bonded together by resin bonding at the tooling surface.

22. A tooling system according to claim 1, wherein the elements are bonded together by welding at the tool surface.

23. A method of tooling, comprising:
   mounting a plurality of elements in an array, each element having an upper portion removably mounted on a base portion;
   adjusting the positions of the elements in a longitudinal direction relative to one another in order to achieve predetermined relative positions of the elements; and
   machining the upper portions to a desired tooling surface contour while the elements are retained in their adjusted positions.

24. A tooling system for approximating a desired tooling surface comprising:
   a plurality of elements arranged in an array, each element being moveable longitudinally relative to the other elements in the array and having a first end;
   adjustment means for individually adjusting positions of the elements in a longitudinal direction in order to achieve predetermined relative positions of the elements;
   retaining means for retaining the elements in their adjusted positions, wherein the first end of each element is provided on a machinable portion removably mounted on a base portion; and
   a plurality of moveable rails, each rail having a plurality of said elements mounted thereon in a single line, the rails being movable relative one another in a direction substantially perpendicular the longitudinal direction of the elements so as to allow the elements to be moved from a closed position, in which the elements on one of said moveable rails contact the elements on an adjacent moveable rail, to an open position, in which elements on at least two adjacent rows of the array are spaced apart such that individual elements can be moved relative one another.

25. A tooling system for approximating a desired tooling surface, comprising:
- a plurality of elements arranged in an array, each element being moveable longitudinally relative to the other elements in the array and having a first end;
- adjustment means for individually adjusting positions of the elements in a longitudinal direction in order to achieve predetermined relative positions of the elements;
- retaining means for retaining the elements in their adjusted positions, wherein the first end of each element is provided on a machinable portion removably mounted on a base portion, the free ends of the elements designed to be machined to produce the desired tooling surface contour; and
- a plurality of moveable rails, each rail having a plurality of said elements mounted thereon in a single line, the rails being movable relative to one another in a direction substantially perpendicular to the longitudinal direction of the elements so as to allow the elements to be moved from a closed position, in which elements on one of said moveable rails contact the elements on adjacent moveable rail, to an open position, in which elements on at least two adjacent rows of the array are spaced apart.

26. A tooling system for approximating a desired tooling surface, comprising:
- a plurality of elements arranged in an array, each element being moveable longitudinally relative to the other elements in the array and having a first end;
- adjustment means for individually adjusting the positions of the elements in a longitudinal direction in order to achieve predetermined relative positions of the elements;
- retaining means for retaining the elements in their adjusted positions, wherein the first end of each element is provided on a machinable portion removably mounted on a base portion, the free ends of the elements designed to be machined to produce the desired tooling surface contour; and
- a plurality of moveable rails, each rail having a plurality of said elements mounted thereon, the rails movable relative to one another in a direction substantially perpendicular to the longitudinal direction of the elements so as to allow the elements to be moved from a closed position, in which the elements on one of said moveable rails contact the elements on adjacent moveable rail, to an open position, in which elements on at least two adjacent rows of the array are spaced apart,
- wherein the elements are substantially square in cross section and rows and columns of elements in the array are arranged at an angle offset from the longitudinal direction of the movable rails.

27. A tooling system according to claim 26, wherein the rows and columns are offset by 45 degrees from the longitudinal direction of the movable rails.

28. A tooling system for approximating a desired tooling surface, comprising:
- a plurality of elements arranged in an array, each element being moveable longitudinally relative to the other elements in the array and having a first end;
- adjustment means for individually adjusting the positions of the elements in a longitudinal direction in order to achieve predetermined relative positions of the elements; and
- retaining means for retaining the elements in their adjusted positions, wherein the first end of each element is provided on a machinable portion removably mounted on a base portion, free ends of the elements designed to be machined to produce a desired tooling surface contour,
- wherein the elements are bonded together at the tooling surface.

29. A tooling system according to claim 28, wherein the elements are bonded together by resin bonding at the tooling surface.

30. A tooling system according to claim 29, wherein the elements are bonded together by welding at the tooling surface.

* * * * *